US011312510B2

(12) United States Patent
Wang et al.

(10) Patent No.: US 11,312,510 B2
(45) Date of Patent: Apr. 26, 2022

(54) METHOD AND APPARATUS FOR CONTROLLING REMOTE SENSING SATELLITES FOR MULTIPLE TERMINALS, AND READABLE STORAGE MEDIUM

(71) Applicant: CHENGDU STAR ERA AEROSPACE TECHNOLOGY CO., LTD., Sichuan (CN)

(72) Inventors: Lei Wang, Sichuan (CN); Qiang Li, Sichuan (CN); Chuan Lu, Sichuan (CN)

(73) Assignee: CHENGDU STAR ERA AEROSPACE TECHNOLOGY CO., LTD.

(*) Notice: Subject to any disclaimer, the term of this patent is extended or adjusted under 35 U.S.C. 154(b) by 0 days.

(21) Appl. No.: 17/419,702

(22) PCT Filed: Jun. 24, 2020

(86) PCT No.: PCT/CN2020/098106
§ 371 (c)(1),
(2) Date: Jun. 29, 2021

(87) PCT Pub. No.: WO2021/128774
PCT Pub. Date: Jul. 1, 2021

(65) Prior Publication Data
US 2021/0347502 A1 Nov. 11, 2021

(30) Foreign Application Priority Data
Dec. 27, 2019 (CN) .......................... 201911387504.2

(51) Int. Cl.
*B64G 1/10* (2006.01)
*B64G 1/24* (2006.01)

(52) U.S. Cl.
CPC ........... *B64G 1/1021* (2013.01); *B64G 1/242* (2013.01)

(58) Field of Classification Search
CPC .............................. B64G 1/1021; B64G 1/242
(Continued)

(56) References Cited

U.S. PATENT DOCUMENTS 8,862,398 B2 * 10/2014 De Vries .................. B64G 3/00
701/519
8,977,619 B2 * 3/2015 Mann ...................... G06F 16/29
707/736
(Continued)

FOREIGN PATENT DOCUMENTS

CN    103281126 A    9/2013
CN    108023636 A    5/2018
(Continued)

OTHER PUBLICATIONS

International Search Report and Written Opinion corresponding to PCT/EP2019/063374, dated Aug. 28, 2020.
(Continued)

*Primary Examiner* — Gertrude Arthur Jeanglaude
(74) *Attorney, Agent, or Firm* — Barnes & Thornburg LLP

(57) ABSTRACT

Provided are a method and apparatus for controlling remote sensing satellites for multiple terminals and a readable storage medium. The method includes: receiving a remote sensing satellite control request sent from a terminal device by a server; calculating, by the server, an orbit of target remote sensing satellite corresponding to each remote sensing satellite control request, and judging whether the orbit of the target remote sensing satellite covers the target location in the remote sensing satellite control request corresponding to the target remote sensing satellite; if yes, determining the
(Continued)

remote sensing satellite control request as a valid remote sensing satellite control request and controlling the target remote sensing satellite corresponding to the remote sensing satellite control request to perform a photographing task by the server; and if no, determining the remote sensing satellite control request as an invalid remote sensing satellite control request by the server.

9 Claims, 6 Drawing Sheets

(58) Field of Classification Search
USPC .......................................................... 701/13
See application file for complete search history.

(56) References Cited

U.S. PATENT DOCUMENTS

2004/0158832 A1* 8/2004 Chechik ............... G01C 11/025
718/102
2013/0275036 A1 10/2013 Olivier et al.

FOREIGN PATENT DOCUMENTS

| CN | 109146955 A | 1/2019 |
|---|---|---|
| CN | 110099216 A | 8/2019 |
| CN | 111130629 A | 5/2020 |

OTHER PUBLICATIONS

First Office Action corresponding CN201911377504.2 dated 202-07-15.
Notification to Grant Patent Right for Invention corresponding to CN201911387504.2 dated Aug. 14, 2020.
First Search of Priority Document corresponding to CN201911387504.2.
Second Search of Priority Document corresponding to CN201911387504.2.

* cited by examiner

METHOD AND APPARATUS FOR CONTROLLING REMOTE SENSING SATELLITES FOR MULTIPLE TERMINALS, AND READABLE STORAGE MEDIUM

CROSS-REFERENCE TO RELATED APPLICATIONS

The present disclosure claims the benefit of priority to International Patent Application No. PCT/CN2020/098106, filed Jun. 24, 2020, and to Chinese Patent Application No. 2019113875042, filed with the Chinese Patent Office on Dec. 27, 2019, entitled "Method and Apparatus for Controlling Remote Sensing Satellites for Multiple terminals, and Readable Storage Medium", each of which is incorporated herein by reference in their entirety, including but without limitation, those portions concerning satellite-related operations.

TECHNICAL FIELD

The present disclosure relates to the technical field of remote sensing satellite communications, and specifically provides a method and apparatus for controlling remote sensing satellites for multiple terminals, and a readable storage medium.

BACKGROUND ART

Remote sensing satellites are built by humans and launched into space with space flight vehicles such as rockets and space shuttles. Remote sensing satellites may be configured to take photos or videos of the earth or a specific location on the earth.

In order to enable remote sensing satellites to take photos or videos of a specific location, it is generally necessary for experienced configurators to plan tasks for the remote sensing satellites. When planning a task for a remote sensing satellite, a configurator needs to have a certain understanding of the remote sensing satellite, for example, the energy and posture of the remote sensing satellite, the power-on time of a camera, the number of times of powering on or off of the camera, and other conditions. The configurators should send control instructions to remote sensing satellites based on the above knowledge to acquire desired images taken by the remote sensing satellites.

However, it often takes great effort and time for experienced configurators to control remote sensing satellites to takes pictures, due to great difficulty in configuration.

SUMMARY

The objectives of the present disclosure are to provide a method and apparatus for controlling remote sensing satellites for multiple terminals, and a readable storage medium so as to reduce the workload of configurators and reduce difficulty in configuration.

In order to achieve at least one of the above objectives, the following technical solutions are used in the present disclosure.

An embodiment of the present disclosure provides a method for controlling remote sensing satellites for multiple terminals, the method comprising: receiving at least one remote sensing satellite control request sent from a terminal device by a server, where the remote sensing satellite control request comprises a target location to be photographed and a target remote sensing satellite expected by a user to perform the photographing; calculating, by the server, an orbit of a target remote sensing satellite corresponding to each remote sensing satellite control request for each of the at least one remote sensing satellite control request, and judging whether the orbit of the target remote sensing satellite covers the target location in the remote sensing satellite control request corresponding to the target remote sensing satellite; if yes, determining the remote sensing satellite control request as a valid remote sensing satellite control request and controlling the target remote sensing satellite corresponding to the remote sensing satellite control request to perform a photographing task by the server; and if no, determining the remote sensing satellite control request as an invalid remote sensing satellite control request by the server.

In the above implementation, the server calculates an orbit of a target remote sensing satellite corresponding to each remote sensing satellite control request and judges whether the orbit covers the target location. If the orbit covers the target location, the server determines the corresponding remote sensing satellite control request as a valid remote sensing satellite control request and may control the target remote sensing satellite corresponding to the valid remote sensing satellite control request to perform a photographing task. If the orbit does not cover the target location, the server determines the remote sensing satellite control request as an invalid remote sensing satellite control request. In the above implementation according to the embodiment of the present disclosure, the judgment of validity or invalidity of the remote sensing satellite control request is performed by the server, thereby reducing the workload of configurators and reducing difficulty in configuration.

Optionally, as a possible implementation, the step of determining the remote sensing satellite control request as a valid remote sensing satellite control request and controlling the target remote sensing satellite corresponding to the remote sensing satellite control request to perform a photographing task by the server comprises: returning the remote sensing satellite control requests determined as valid remote sensing satellite control requests to the corresponding terminal device by the server, so that the terminal device selects, from the remote sensing satellite control requests determined as valid remote sensing satellite control requests that are returned by the server, at least one remote sensing satellite control request as a remote sensing satellite control request to be executed and resubmits the remote sensing satellite control request to be executed to the server; and controlling, by the server, the target remote sensing satellite corresponding to the remote sensing satellite control request to be executed to perform a photographing task according to the remote sensing satellite control request to be executed that is resubmitted by the terminal device.

In the above implementation, the server returns the valid remote sensing satellite control requests to the terminal device held by the user, so that the user selects at least one valid remote sensing satellite control request via the terminal device held by him or her, so as to resubmit the at least one valid remote sensing satellite control request to the server. After the server receives the valid remote sensing satellite control request resubmitted by the user, the server may control the target remote sensing satellite corresponding to the remote sensing satellite control request to perform a photographing task. In the above implementation, after the user resubmits a valid remote sensing satellite control request, the server may control the corresponding remote sensing satellite to perform a photographing task without requiring the user to know information such as the performance of all the remote sensing satellites in orbit, which lowers the technical threshold for control of remote sensing satellites.

Optionally, as a possible implementation, the step of controlling, by the server, the target remote sensing satellite corresponding to the remote sensing satellite control request to be executed to perform a photographing task according to the remote sensing satellite control request to be executed that is resubmitted by the terminal device comprises: causing the server to receive the at least one remote sensing satellite control request to be executed that is resubmitted by the terminal device, where the remote sensing satellite control request to be executed comprises a valid target location to be photographed and a valid target remote sensing satellite intended to perform the photographing; causing the server to calculate, for each of the remote sensing satellite control requests to be executed, information on a first time point at which the valid target remote sensing satellite enters a ground station, wherein the ground station is configured to receive information transmitted from the corresponding remote sensing satellite; causing the server to calculate, according to position information of the valid target location, orbit information of the valid target remote sensing satellite, and position information of the valid target remote sensing satellite at a current time point, information on a second time point at which the valid target remote sensing satellite enters the valid target location; and causing the server to arrange a photographing task corresponding to coordinates of the valid target location to a selected position of a task list of the valid target remote sensing satellite according to the first time point information and the second time point information.

In the above implementation, the server may calculate information on a first time point at which the valid target remote sensing satellite enters the ground station and information on a second time point at which the valid target remote sensing satellite enters the valid target location, and then arrange the photographing task at a selected position of a task list of the valid target remote sensing satellite according to the first time point information and the second time point information. In this way, a duration of execution of the photographing task can be selected more appropriately according to the time points at which the valid target remote sensing satellite will pass over the ground station and over the valid target location. If the remote sensing satellite will go to the ground station at an earlier time point than to the valid target location, it is meant that the available storage space of the remote sensing satellite will be increased, so that there will be more selectable positions in the task list of the remote sensing satellite. Thus, the photographing task of photographing the valid target location can be arranged at a prior position among the selectable positions in the task list.

Optionally, as a possible implementation, the method further comprises, after causing the server to arrange a photographing task corresponding to the coordinates of the valid target location to the selected position of the task list of the valid target remote sensing satellite according to the first time point information and the second time point information, causing the server to lock task resources required to be occupied by the task of photographing the valid target location to be photographed by using a resource lock.

In the above implementation, the task resources required to be occupied by the photographing task are locked, which can avoid operation errors caused by repetitive selection of the same task resources for subsequent photographing tasks.

Optionally, as a possible implementation, the step of causing the server to calculate information on a first time point at which the valid target remote sensing satellite enters a ground station comprises: causing the server to calculate, according to the position information of the valid target remote sensing satellite at the current time point and position information of a ground station corresponding to the valid target remote sensing satellite, information on an angle of the valid target remote sensing satellite relative to the corresponding ground station at the current time point; and causing the server to calculate, according to the information on the angle of the valid target remote sensing satellite relative to the corresponding ground station at the current time point, an antenna constraint condition, and the orbit information of the valid target remote sensing satellite, the information on the first time point at which the valid target remote sensing satellite enters the corresponding ground station.

In the above implementation, in order to calculate available storage resources of each remote sensing satellite at the second time point, it is possible to firstly calculate first time point information corresponding to the timing of entry of each remote sensing satellite into the corresponding ground station and then judge whether a first time point corresponding to the first time point information is earlier or later than the second time point. if the first time point is earlier than the second time point, it is indicated that the corresponding remote sensing satellite may also transmit some information to the ground station before entering the target location, thereby freeing up more available storage resources.

Optionally, as a possible implementation, the step of causing the server to calculate, according to the position information of the valid target remote sensing satellite at the current time point and position information of a ground station corresponding to the valid target remote sensing satellite, information on an angle of the valid target remote sensing satellite relative to the corresponding ground station at the current time point comprises: converting coordinates related to the position information of the valid target remote sensing satellite at the current time point from a J2000 coordinate system to an earth-fixed coordinate system by the server; calculating positional coordinates of the valid target remote sensing satellite in a measuring station coordinate system according to the coordinates of the valid target remote sensing satellite in the earth-fixed coordinate system by the server; and calculating the information on the angle of the valid target remote sensing satellite relative to the ground station at the current time point according to the positional coordinates of the valid target remote sensing satellite in the measuring station coordinate system by the server.

Optionally, as a possible implementation, the step of causing the server to calculate, according to position information of the valid target location, orbit information of the valid target remote sensing satellite, and position information of the valid target remote sensing satellite at a current time point, information on a second time point at which the valid target remote sensing satellite enters the valid target location comprises: causing the server to calculate information on an angle of the valid target remote sensing satellite relative to the valid target location at the current time point according to the position information of the valid target remote sensing satellite at the current time point and the position information of the valid target location; and causing the server to calculate, according to the information on the angle of the valid target remote sensing satellite relative to the valid target location at the current time point and the orbit information of the valid target remote sensing satellite, the information on the second time point at which the valid target remote sensing satellite enters the valid target location.

Optionally, as a possible implementation, the step of causing the server to calculate information on an angle of the valid target remote sensing satellite relative to the valid target location at the current time point according to the position information of the valid target remote sensing satellite at the current time point and the position information of the valid target location comprises: converting the coordinates of the valid target location from a spherical coordinate system to an earth-fixed coordinate system by the server; converting the coordinates of the valid target location from the earth-fixed coordinate system to a J2000 coordinate system by the server; converting the coordinates of the valid target location from the J2000 coordinate system to an orbital coordinate system by the server; and calculating the information on the angle of the valid target remote sensing satellite relative to the valid target location at the current time point using the coordinates of the valid target location in the orbital coordinate system and the coordinates related to the position information of the valid target remote sensing satellite at the current time point by the server.

An embodiment of the present disclosure further provides a method for controlling remote sensing satellites for multiple terminals, the method comprising: displaying first prompt information on a display interface of a terminal device by the terminal device in response to an operation request related to a remote sensing satellite selection button from a user, where the first prompt information is configured to guide the user to input a target remote sensing satellite expected by the user to perform photographing, and/or the first prompt information is configured to guide the user to select a target remote sensing satellite expected by the user to perform photographing from a plurality of candidate remote sensing satellites displayed on the display interface of the terminal device; responding to an operation request related to a target remote sensing satellite from the user by the terminal device, where the target remote sensing satellite is the target remote sensing satellite expected by the user to perform photographing that is input by the user, and/or the target remote sensing satellite expected by the user to perform photographing that is selected by the user from the plurality of candidate remote sensing satellites; displaying second prompt information on the display interface of the terminal device by the terminal device in response to an operation request related to a target selection button from the user, where the second prompt information is configured to guide the user to input a target location to be photographed, and/or the second prompt information is configured to guide the user to select a target location to be photographed from a plurality of candidate locations displayed on the display interface of the terminal device; responding to an operation request related to a target location from the user by the terminal device, where the target location is the target location to be photographed that is input by the user and/or the target location to be photographed that is selected by the user from the plurality of candidate locations; and sending a remote sensing satellite control request to the server by the terminal device in response to a task planning request from the user, where the remote sensing satellite control request comprises the target location to be photographed and the target remote sensing satellite expected by the user to perform photographing.

An embodiment of the present disclosure further provides an apparatus for controlling remote sensing satellites for multiple terminals, the apparatus comprising: a control request receiving module configured to receive at least one remote sensing satellite control request sent from a terminal device, where the remote sensing satellite control request comprises a target location to be photographed and a target remote sensing satellite expected by a user to perform the photographing; an orbit coverage judgment module configured to calculate an orbit of a target remote sensing satellite corresponding to each remote sensing satellite control request for each of the at least one remote sensing satellite control request, and judge whether the orbit of the target remote sensing satellite covers the target location in the remote sensing satellite control request corresponding to the target remote sensing satellite; a validity determination module configured to determine the remote sensing satellite control request as a valid remote sensing satellite control request and control the target remote sensing satellite corresponding to the remote sensing satellite control request to perform a photographing task, when the orbit of the target remote sensing satellite covers the target location in the remote sensing satellite control request corresponding to the target remote sensing satellite; and an invalidity determination module configured to determine the remote sensing satellite control request as an invalid remote sensing satellite control request when the orbit of the target remote sensing satellite does not cover the target location in the remote sensing satellite control request corresponding to the target remote sensing satellite.

An embodiment of the present disclosure further provides an apparatus for controlling remote sensing satellites for multiple terminals, the apparatus comprising: a remote sensing satellite selection module configured to display first prompt information on a display interface of a terminal device in response to an operation request related to a remote sensing satellite selection button from a user, where the first prompt information is configured to guide the user to input a target remote sensing satellite expected by the user to perform photographing, and/or the first prompt information is configured to guide the user to select a target remote sensing satellite expected by the user to perform photographing from a plurality of candidate remote sensing satellites displayed on the display interface of the terminal device; and further configured to respond to an operation request related to a target remote sensing satellite from the user, where the target remote sensing satellite is the target remote sensing satellite expected by the user to perform photographing that is input by the user, and/or the target remote sensing satellite expected by the user to perform photographing that is selected by the user from the plurality of candidate remote sensing satellites; a location selection module configured to display second prompt information on the display interface of the terminal device in response to an operation request related to a target selection button from the user, where the second prompt information is configured to guide the user to input a target location to be photographed, and/or the second prompt information is configured to guide the user to select a target location to be photographed from a plurality of candidate locations displayed on the display interface of the terminal device; and further configured to respond to an operation request related to a target location from the user, where the target location is the target location to be photographed that is input by the user and/or the target location to be photographed that is selected by the user from the plurality of candidate locations; and a request sending module configured to send a remote sensing satellite control request to the server in response to a task planning request from the user, where the remote sensing satellite control request comprises the target location to be photographed and the target remote sensing satellite expected by the user to perform photographing.

An embodiment of the present disclosure further provides a readable storage medium, storing a computer program that, when run by a processor, executes the method for controlling remote sensing satellites for multiple terminals described above.

An embodiment of the present disclosure further provides an electronic device, comprising: a processor, a memory, and a bus, wherein the memory stores machine-readable instructions executable by the processor.

When the electronic device is running, the processor communicates with the memory via the bus, and the machine-readable instructions are executed by the processor to execute the method for controlling remote sensing satellites for multiple terminals described above.

An embodiment of the present disclosure further provides a computer program product, which, when running on a computer, causes the computer to execute the method for controlling remote sensing satellites for multiple terminals described above.

DETAILED DESCRIPTION OF THE EMBODIMENTS

Only certain exemplary embodiments are briefly described hereinafter. As will be appreciated by those skilled in the art, the described embodiments may be modified in various different ways without departing from the spirit or scope of the present disclosure. Accordingly, the drawings and description are to be regarded as illustrative in nature and not restrictive.

The technical solutions in the embodiments of the present disclosure will be described below with reference to the accompanying drawings in the embodiments of the present disclosure.

Figure 1:
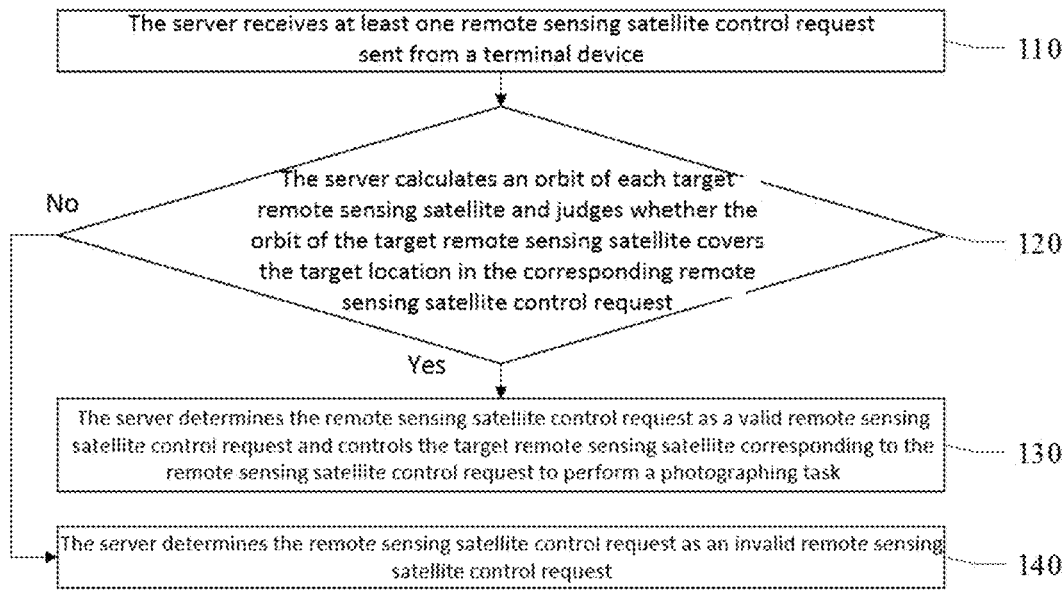
FIG. 1 is a schematic flowchart of a method for controlling remote sensing satellites for multiple terminals according to an embodiment of the present disclosure.

FIG. 1 is a schematic flowchart of a method for controlling remote sensing satellites for multiple terminals according to an embodiment of the present disclosure. The method for controlling remote sensing satellites for multiple terminals is applicable to an electronic device. The electronic device may be a device capable of computation of big data and storage of mass data. For example, the electronic device may be a server or a computer with high computing capability.

For example, when the electronic device is used as a server, the method for controlling remote sensing satellites for multiple terminals according to the embodiment of the present disclosure may include the following steps 110 to 140.

In 110, the server receives at least one remote sensing satellite control request sent from a terminal device, where the remote sensing satellite control request includes a target location to be photographed and a target remote sensing satellite expected by the user to perform the photographing.

In some possible implementations, the terminal device may be a user terminal device held by a user and, for example, may be a mobile terminal device such as a mobile phone, a tablet computer, or a notebook computer, or may be a wearable smart terminal such as a smart watch or a smart wristband. It can be understood that the specific types of the terminal device in the foregoing example should not be construed as limiting the embodiment of the present disclosure. In some other possible implementations of the embodiment of the present disclosure, the terminal device may be selected from other terminals, for example, other terminals such as a tablet computer.

In some possible implementations, the server may receive a remote sensing satellite control request sent from one terminal device or receive remote sensing satellite control requests sent respectively from a plurality of terminal devices, and process the remote sensing satellite control request(s). The above-mentioned target location to be photographed may be a location expected to be photographed by the user.

In some possible implementations, the target remote sensing satellite expected by the user to perform photographing may be a target remote sensing satellite expected to be used by the user to photograph the target location; wherein one or more target remote sensing satellites may be expected by the user to perform photographing. In other words, the user may select only one target remote sensing satellite that is expected to perform photographing and send its information together with the target location as one remote sensing satellite control request to the server, or simultaneously select a plurality of target remote sensing satellites that are expected to perform photographing and send information on the plurality of target remote sensing satellites expected to perform photographing together with the target location as one remote sensing satellite control request to the server, so as to allow the server to select one from the plurality of target remote sensing satellites expected to perform photographing.

In step 120, the server calculates an orbit of a target remote sensing satellite corresponding to each remote sensing satellite control request for each of the at least one remote sensing satellite control request, and judges whether the orbit of the target remote sensing satellite covers the target location in the remote sensing satellite control request corresponding to the target remote sensing satellite. If yes, step 130 is executed. If no, step 140 is executed.

In some possible implementations, the server may obtain the corresponding target remote sensing satellites from the remote sensing satellite control requests in response to the received remote sensing satellite control requests, and then calculate the orbit of each of the target remote sensing satellites.

Here, the orbit of each target remote sensing satellite may be obtained by the server. For example, the server may perform numerical integration calculations based on the epoch time and the initial number of orbits in J2000 in combination with, for example, the aspherical gravitational perturbation of the earth, the third body perturbation, the tidal perturbation, the solar radiation perturbation, the atmospheric perturbation, or the like, to obtain information such as the orbit, positional coordinates, and speed of a remote sensing satellite at any time, so as to obtain the orbit of each target remote sensing satellite.

In this way, after the orbit of each target remote sensing satellite is obtained, the server judges, for each target remote sensing satellite, whether the orbit covers the corresponding target location. If the orbit covers the target location, it is meant that the corresponding target remote sensing satellite will pass over the target location with an elapse of time, then step 130 is executed. If the orbit does not cover the target location, it is meant that the target remote sensing satellite will not appear over the target location even as time elapses, then step 140 is executed.

In step 130, the server determines the remote sensing satellite control request as a valid remote sensing satellite control request and controls the target remote sensing satellite corresponding to the remote sensing satellite control request to perform a photographing task.

In some possible implementations, the valid remote sensing satellite control request may refer to a remote sensing satellite control request, included in the remote sensing satellite control requests, in which the target remote sensing satellite can photograph the target location.

Figure 2:
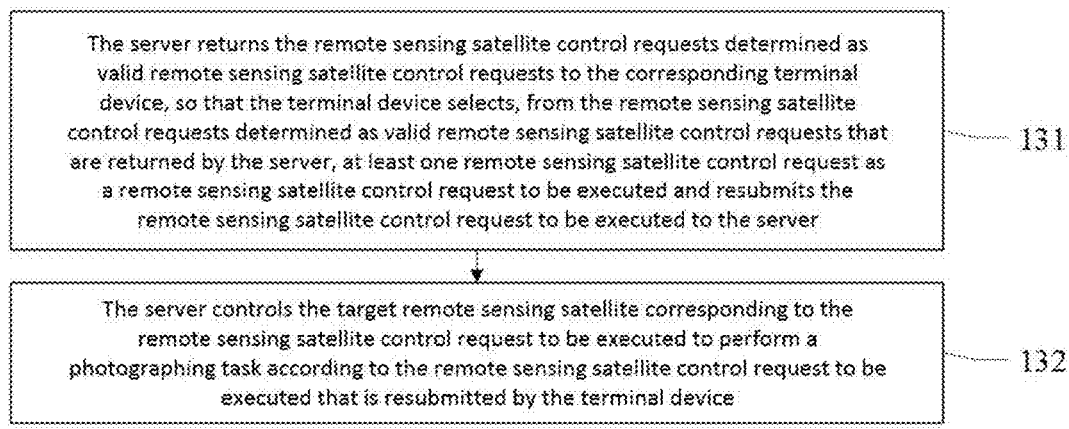
FIG. 2 shows a schematic flowchart of the sub-steps of step 130 in FIG. 1.

Here, as a possible implementation, referring to FIG. 2, FIG. 2 shows a schematic flowchart of the sub-steps of step 130 in FIG. 1. The step 130 may include the following steps 131 to 132.

In step 131, the server returns the remote sensing satellite control requests determined as valid remote sensing satellite control requests to the corresponding terminal device, so that the terminal device selects, from the remote sensing satellite control requests determined as valid remote sensing satellite control requests that are returned by the server, at least one remote sensing satellite control request as a remote sensing satellite control request to be executed and resubmits the remote sensing satellite control request to be executed to the server.

In step 132, the server controls the target remote sensing satellite corresponding to the remote sensing satellite control request to be executed to perform a photographing task according to the remote sensing satellite control request to be executed that is resubmitted by the terminal device.

In some possible implementations, the server may return the valid remote sensing satellite control requests to the terminal device of the user, so that the user may select a valid remote sensing satellite control request therefrom via the terminal device and resubmit the valid remote sensing satellite control request to the server.

Next, the server may respond to the received remote sensing satellite control request to be executed that is resubmitted by the user and may control the target remote sensing satellite corresponding to the remote sensing satellite control request to be executed to perform the photographing task.

In this way, after the user resubmits a remote sensing satellite control request to be executed, the server may control the corresponding remote sensing satellite to perform a photographing task without requiring the user to know information such as the performance of all the remote sensing satellites in orbit, thereby lowering the technical threshold for control of remote sensing satellites and accelerating the popularization of commercial remote sensing satellites in the market.

Figure 3:
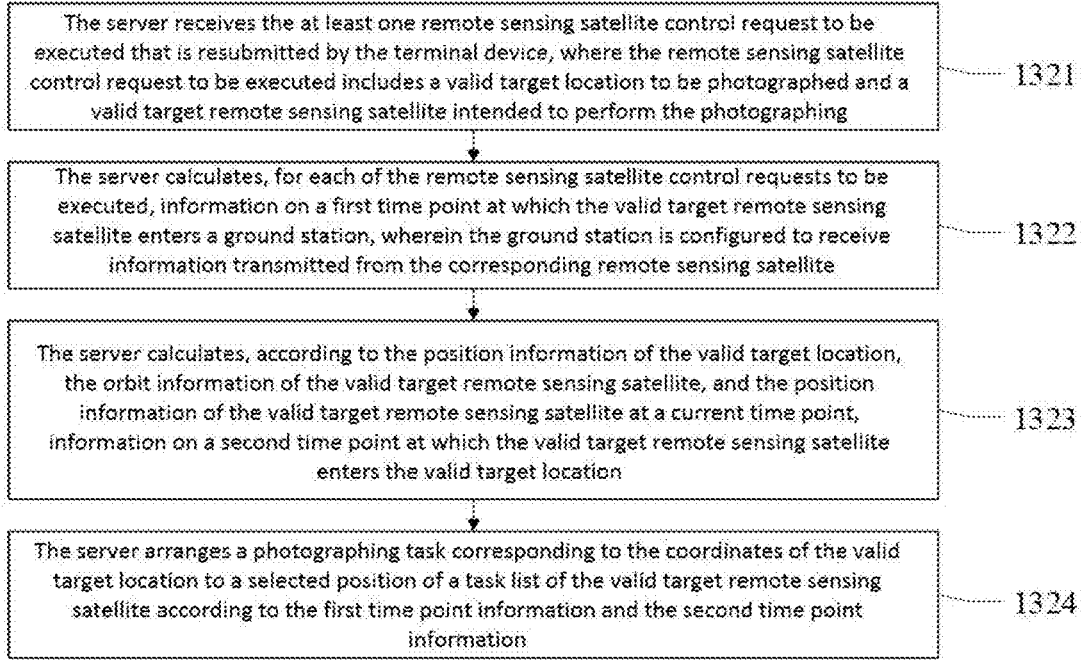
FIG. 3 shows a schematic flowchart of the sub-steps of step 132 in FIG. 2.

Here, as a possible implementation, referring to FIG. 3, FIG. 3 shows a schematic flowchart of the sub-steps of step 132 in FIG. 2. The step 132 may include the following steps 1321 to 1324.

In step 1321, the server receives the at least one remote sensing satellite control request to be executed that is resubmitted by the terminal device, where the remote sensing satellite control request to be executed includes a valid target location to be photographed and a valid target remote sensing satellite intended to perform the photographing.

In some possible implementations, the valid target location may be a target location that can be photographed by a certain target remote sensing satellite, and the valid target remote sensing satellite may be a target remote sensing satellite capable of photographing the valid target location.

In step 1322, the server calculates, for each of the remote sensing satellite control requests to be executed, information on a first time point at which the valid target remote sensing satellite enters a ground station. Here, the ground station is configured to receive information transmitted from the corresponding remote sensing satellite.

In some possible implementations, the ground station may be configured to receive information fed back by the corresponding remote sensing satellite when each remote sensing satellite enters or has access to the corresponding ground station. The information fed back may include the task result of the photographing task. Here, the first time point at which each remote sensing satellite enters the ground station may be the earliest time point at which each remote sensing satellite can interact with the ground station. Since each remote sensing satellite runs along its own orbit, each remote sensing satellite can send the captured information to the ground station when it enters the signal radiation range of the ground station along the orbit.

In a possible implementation, when executing the step 1322, the server may first calculate, according to the position information of the valid target remote sensing satellite at the current time point and position information of a ground station corresponding to the valid target remote sensing satellite, information on an angle of the valid target remote sensing satellite relative to the corresponding ground station at the current time point, and then the server may calculate, according to the information on the angle of the valid target remote sensing satellite relative to the corresponding ground station at the current time point, an antenna constraint condition, and the orbit information of the valid target remote sensing satellite, the information on the first time point at which the valid target remote sensing satellite enters the corresponding ground station.

It should be noted here that the above-mentioned antenna constraint condition may be preset. For example, an angle of radiation from the ground station may be pre-configured as the antenna constraint condition. In addition, the angle of radiation from the ground station may be fixed. Since the angle information and the time point information generally correspond to each other in the orbit of the remote sensing satellite, the server may calculate, according to the information on the angle of the valid target remote sensing satellite relative to the ground station at the current time point in combination with the antenna constraint condition and the orbit of the valid target remote sensing satellite, the information on the first time point at which the valid target remote sensing satellite enters the corresponding ground station.

Optionally, as a possible implementation, the calculation of the information on the angle of the valid target remote sensing satellite relative to the corresponding ground station at the current time point by the server may include the following steps 13221 to 13223.

In step 13221, the server converts the coordinates related to the position information of the valid target remote sensing satellite at the current time point from a J2000 coordinate system to an earth-fixed coordinate system.

In some possible implementations, the J2000 coordinate system may have an origin at the center of the earth, have an xy coordinate plane in the mean equatorial plane at epoch J2000.0, and have an x-axis in the direction of the mean spring equinox of the epoch.

In addition, the earth-fixed coordinate system may have an origin at the center of the earth, have a z-axis in the direction of the Conventional International Origin (referred simply to as CIO), have an xy coordinate plane in the equatorial plane of the earth passing through the center of the earth and perpendicular to the CIO direction, and have an x-axis pointing in the direction of the Greenwich Meridian.

Optionally, in some possible implementations, the server may calculate a vector $R_{sat}$ of the valid target remote sensing satellite in the earth-fixed coordinate system according to the following formula:

$$R_{sat} = (HG) r_{sat}$$

where $r_{sat}$ may be a vector of the valid target remote sensing satellite in the J2000 coordinate system, HG may represent a conversion matrix from the J2000 coordinate system to the earth-fixed coordinate system, HG may be calculated according to the formula (HG)=(EP)(ER)(NR)(PR), EP may represent a preset polar motion matrix, ER may represent a sidereal time conversion matrix, NR may represent a nutation matrix, and PR may represent a precession matrix, where each of ER, NR, and PR is a function of time and may be calculated according to a time point corresponding to $r_{sat}$. For example, the above-mentioned ER, NR, and PR may be obtained according to a preset calculation function by substituting the time point corresponding to $r_{sat}$ into the preset calculation function.

In step 13222, the server calculates positional coordinates of the valid target remote sensing satellite in a measuring station coordinate system according to the coordinates of the valid target remote sensing satellite in the earth-fixed coordinate system.

In some possible implementations, the measuring station coordinate system may have a coordinate origin set at the center of the ground station, have an x-axis pointing to the east in a horizontal plane passing through the coordinate origin of the measuring station coordinate system, have a y-axis passing through the coordinate origin of the measuring station coordinate system and pointing to the north, and have a z-axis perpendicular to the xy plane and forming a right-handed coordinate system together with the x-axis and the y-axis.

In this way, as a possible implementation, the server calculates a vector $R'$ of the valid target remote sensing satellite in the measuring station coordinate system according to the following formula:

$$R' = R_y\left(\varphi_0 - \frac{\pi}{2}\right) R_z(\lambda_0 - \pi)(R_{sat} - R_{station})$$

where $R_{sat}$ may be a vector of the position of the valid target remote sensing satellite in the earth-fixed coordinate system, and the geodetic coordinates of the ground station may be expressed as $(\lambda_0, \varphi_0, h_0)$, where $\lambda_0$ denotes a geodetic longitude, $\varphi_0$ denotes a geodetic latitude, and $h_0$ denotes a geodetic altitude, $$R_y(\theta) = \begin{pmatrix} \cos\theta & 0 & -\sin\theta \\ 0 & 1 & 0 \\ \sin\theta & 0 & \cos\theta \end{pmatrix},$$

$$R_z(\theta) = \begin{pmatrix} \cos\theta & \sin\theta & 0 \\ -\sin\theta & \cos\theta & 0 \\ 0 & 0 & 1 \end{pmatrix},$$

$\theta$ represents a corresponding angle parameter, and $R_{station}$ may be a vector of the valid target location in the earth-fixed system at the ground station.

In step 13223, the server calculates the information on the angle of the valid target remote sensing satellite relative to the ground station at the current time point according to the positional coordinates of the valid target remote sensing satellite in the measuring station coordinate system.

In some possible implementations, the angle information may include an azimuth angle and an altitude angle. Assuming that the vector of the valid target remote sensing satellite in the measuring station coordinate system that is calculated in the above step 13222 is expressed as R' (X, Y, Z), the server may calculate the azimuth angle Az and the altitude angle El according to the following formulae:

$$Az = a\sin(Y/\sqrt{X^2+Y^2})$$

$$El = a\tan(Z/\sqrt{X^2+Y^2})$$

where a tan is an arctangent function, and a sin is an arcsine function.

In step 1323, the server calculates, according to the position information of the valid target location, the orbit information of the valid target remote sensing satellite, and the position information of the valid target remote sensing satellite at a current time point, information on a second time point at which the valid target remote sensing satellite enters the valid target location.

Optionally, as a possible implementation, when executing the step 1323, the server may first calculate information on an angle of the valid target remote sensing satellite relative to the valid target location at the current time point according to the position information of the valid target remote sensing satellite at the current time point and the position information of the valid target location, and then the server may calculate, according to the information on the angle of the valid target remote sensing satellite relative to the valid target location at the current time point and the orbit information of the valid target remote sensing satellite, the information on the second time point at which the valid target remote sensing satellite enters the valid target location.

Here, since the angle information and the time point information generally correspond to each other in an orbit, the server may calculate, according to the information on the angle of the valid target remote sensing satellite relative to the target location at the current time point and the orbit of the valid target remote sensing satellite, the information on the second time point at which the valid target remote sensing satellite enters the corresponding target location.

For example, in a possible implementation, the calculation of the information on the angle of the valid target remote sensing satellite relative to the valid target location at the current time point by the server may include the following steps 13231 to 13234.

In step 13231, the coordinates of the valid target location are converted from a spherical coordinate system to the earth-fixed coordinate system.

In some possible implementations, the spherical coordinate system may be a coordinate system $(\lambda, \varphi, h)$ with the center of the earth as the origin, where $h$ may be a geodetic altitude, $\lambda$ may be a geodetic longitude, $\varphi$ may be a geodetic latitude, and the geodetic latitude $\varphi$ may be the angle between the equatorial plane and a line normal to the reference ellipsoid of the valid target location, which is positive when measured from the equatorial plane to the north and is negative when measured from the equatorial plane to the south.

In this way, the server may calculate the coordinates $(X_e, Y_e, Z_e)$ of the valid target location in the earth-fixed coordinate system according to the following formula:

$$\begin{cases} X_e = (N+h)\cos\varphi\cos\lambda \\ Y_e = (N+h)\cos\varphi\sin\lambda \\ Z_e = [N(1-f)^2 + h]\sin\varphi \end{cases}$$

where
$N = a_e[\cos^2\varphi + (1-f)^2 \sin^2\varphi]^{-1/2} = a_e[1-2f(1-f/2)\sin^2\varphi]^{-1/2}$, $a_e$ may be the equatorial radius of the reference ellipsoid, f may be the geometric oblateness of the reference ellipsoid, and $X_e$, $Y_e$, and $Z_e$ denote an x-coordinate value, a y-coordinate value, and a z-coordinate value of the valid target location in the earth-fixed coordinate system, respectively.

Optionally, in a possible implementation, the server may replace H and $\varphi$ in the above formula with the geocentric distance $\rho$ and geocentric latitude $\varphi'$ of the valid target location, respectively. In this way, the above calculation of $(X_e, Y_e, Z_e)$ may be expressed as follows:

$$\begin{cases} X_e = \rho\cos\varphi'\cos\lambda \\ Y_e = \rho\cos\varphi'\sin\lambda \\ Z_e = \rho\sin\varphi' \end{cases}$$

In step 13232, the coordinates of the valid target location are converted from the earth-fixed coordinate system to the J2000 coordinate system.

Here, the server may calculate a vector $r_{station}$ of the valid target location in the J2000 coordinate system according to the following formula:

$$r_{station} = (HG)^{-1} R_{station}$$

where $R_{station}$ may be the vector of the valid target location in the earth-fixed coordinate system.

In step 13233, the coordinates of the valid target location are converted from the J2000 coordinate system to an orbital coordinate system.

In some possible implementations, the orbital coordinate system may have an origin coinciding with the center of mass of the valid target remote sensing satellite, have an axis $z_0$ pointing to the center of the earth, have an axis $x_0$ perpendicular to the axis $z_0$ and pointing to the flight direction, and have an axis $y_0$ perpendicular to the plane $x_0z_0$, where the axes $x_0$, $y_0$, and $z_0$ may form a right-hand coordinate system.

In this way, the server may calculate a vector $r_{orbit}$ of the coordinates of the valid target location in the orbital coordinate system according to the following formula:

$$r_{orbit} = T \cdot (r_{station} - r_{sat})$$

where $r_{sat}$ may be the vector of the valid target remote sensing satellite in the J2000 coordinate system, $T = R_x(-\pi/2) \cdot R_z(\omega + f' + \pi/2) \cdot R_x(i) \cdot R_z(\Omega)$, where $\omega$ may represent a depression angle of perigee of the orbit, f' may represent an orbit true anomaly, i may represent an orbit inclination, $\Omega$ may represent the right ascension of the ascending node, $$R_z(\theta) = \begin{pmatrix} \cos\theta & \sin\theta & 0 \\ -\sin\theta & \cos\theta & 0 \\ 0 & 0 & 1 \end{pmatrix},$$

$$R_x(\theta) = \begin{pmatrix} 1 & 0 & 0 \\ 0 & \cos\theta & \sin\theta \\ 0 & -\sin\theta & \cos\theta \end{pmatrix},$$

and $\theta$ denotes a corresponding angle parameter.

In step 13234, the information on the angle of the valid target remote sensing satellite relative to the valid target location at the current time point is calculated using the coordinates of the valid target location in the orbital coordinate system and the coordinates related to the position information of the valid target remote sensing satellite at the current time point.

In some possible implementations, the above-mentioned angle information may include an azimuth angle and an altitude angle. The server may calculate the azimuth angle Az' according to the following formula:

$$Az' = a\tan((r_{orbit} \cdot y)/(r_{orbit} \cdot x))$$

In addition, the server may calculate the altitude angle El' according to the following formula:

$$El' = a\tan[(r_{orbit} \cdot z)/\sqrt{(r_{orbit} \cdot x)^2 + (r_{orbit} \cdot y)^2}]$$

where $r_{orbit} \cdot z$ may be a component of the valid target location in the direction $z_0$ in the orbital coordinate system, $r_{orbit} \cdot y$ may be a component of the valid target location in the direction $y_0$ in the orbital coordinate system, $r_{orbit} \cdot x$ may be a component of the valid target location in the direction $x_0$ in the orbital coordinate system, and a tan denotes an arctangent function.

Moreover, the server may calculate $\rho_{sat}$ according to the following formula:

$$\rho_{sat} = |r_{orbit}|$$

where $\rho_{sat}$ may be the distance from the coordinates of the valid target remote sensing satellite at the current time point to the valid target location.

In step 1324, the server arranges a photographing task corresponding to the coordinates of the valid target location to a selected position of a task list of the valid target remote sensing satellite according to the first time point information and the second time point information.

In some possible implementations, the server may calculate information on a first time point at which the valid target remote sensing satellite enters the ground station and information on a second time point at which the valid target remote sensing satellite enters the valid target location, and then arrange the photographing task at a selected position of the task list of the valid target remote sensing satellite according to the first time point information and the second time point information.

Here, it can be understood that the server calculates the first time point information and the second time point information for the purpose of determining, according to the sequence of the first time point and the second time point, storage resources of the valid target remote sensing satellite available at the second time point when the valid target remote sensing satellite enters the valid target location.

For example, if the first time point is earlier than the second time point, it is indicated that the valid target remote sensing satellite may also transmit some information to the ground station before entering the valid target location, thereby freeing up more available storage resources. If the first time point is later than the second time point, it is indicated that the storage resources of the valid target remote sensing satellite available when entering the valid target location will be less than or equal to the remaining storage resources of the remote sensing satellite in the current state.

Therefore, the server can reasonably arrange the photographing task at a selected position in the task list according to the remaining storage resources of the remote sensing satellite, so that the available storage space of the valid target remote sensing satellite at the selected position at the corresponding time point can sufficiently satisfy a storage space intended to be occupied by the photographing task.

Optionally, if the remaining available storage resources of the remote sensing satellite can satisfy the storage space intended to be occupied by the photographing tasks, the server may arrange the photographing tasks of the valid target remote sensing satellite in a first-in-first-out queue. If the remaining available storage resources of the remote sensing satellite cannot satisfy the storage space intended to be occupied by the photographing task, the server may determine a task to be executed immediately after the second time point according to the orbit of the valid target remote sensing satellite, the second time point, and a plurality of tasks that have been arranged in the task list of the valid target remote sensing satellite, and arrange this photographing task of the valid target remote sensing satellite in the task list prior to the task to be executed immediately after the second time point.

Here, in some possible implementations, the server may calculate the available storage resources in the following manner.

If the first time point is earlier than the second time point, available storage resources to be freed (or released) after the valid target remote sensing satellite passes over the corresponding ground station are calculated.

Storage resources of the valid target remote sensing satellite available at the corresponding second time point when the valid target remote sensing satellite enters the valid target location are calculated by adding the calculated available storage resources of the valid target remote sensing satellite at the current time point to the calculated available storage resources to be freed after the valid target remote sensing satellite passes over the corresponding ground station.

If the first time point is later than the second time point, the available storage resources of the valid target remote sensing satellite at the current time point are calculated as storage resources of the valid target remote sensing satellite available at the corresponding second time point when the valid target remote sensing satellite enters the valid target location.

It should be noted that, as a possible implementation, the available storage resources to be freed after the valid target remote sensing satellite passes over the corresponding ground station may be calculated according to a signal radiation range of the ground station corresponding to the valid target remote sensing satellite, a length of a path along which the valid target remote sensing satellite will fly within the signal radiation range of the corresponding ground station, and a speed at which the valid target remote sensing satellite transmits data to the corresponding ground station.

For example, in some possible implementations of the embodiment of the present disclosure, the server may calculate the available storage resources to be freed after the valid target remote sensing satellite passes over the corresponding ground station, by dividing the length of the path, along which the valid target remote sensing satellite will fly within the signal radiation range of the corresponding ground station, by the flight speed of the valid target remote sensing satellite and then multiplying the obtained quotient by the speed at which the valid target remote sensing satellite transmits data to the corresponding ground station. In other words, the server may first calculate a duration during which the valid target remote sensing satellite will be flying within the signal radiation range of the corresponding ground station and then multiply the duration by the speed of data transmission to obtain the amount of data to be transmitted from the valid target remote sensing satellite, thereby obtaining the available storage resources to be freed after the valid target remote sensing satellite passes over the corresponding ground station.

It should be additionally noted that, in some possible implementations, the above two methods of calculating the storage resources of the valid target remote sensing satellite available when it enters the valid target location may be combined with each other. For example, the available storage resources of the valid target remote sensing satellite at the current time point are calculated.

The storage resources to be occupied by the photographing task to be executed that have been deducted from the valid target remote sensing satellite are calculated.

If the first time point is earlier than the second time point, available storage resources to be freed after the valid target remote sensing satellite passes over the corresponding ground station are calculated.

The calculated available storage resources of the valid target remote sensing satellite at the current time point are added to the calculated available storage resources to be freed after the valid target remote sensing satellite passes over the corresponding ground station, and the storage resources to be occupied by the photographing task to be executed that have been deducted from the valid target remote sensing satellite are subtracted from the calculated sum. The result so calculated may represent the storage resources of the valid target remote sensing satellite available at the corresponding second time point when the valid target remote sensing satellite enters a respective valid target location.

Optionally, in a possible implementation, after the step 1324, the method for controlling remote sensing satellites for multiple terminals further includes: causing the server to lock the task resources required to be occupied by the photographing task by using a resource lock.

In some possible implementations, a photographing task generally needs to occupy storage resources. For example, the photographing time has been occupied by the photographing task, and the pictures captured by the photographing task need to occupy the storage space of the remote sensing satellite. When the remote sensing satellite is passing over a terrestrial ground station, the pictures will be sent to the ground station and may also occupy the storage space of the ground station.

Therefore, as a possible implementation, the server may lock the storage resources to be occupied by the photographing task from the corresponding remainder, so that it can be better evaluated whether each remote sensing satellite can undertake the next photographing task.

In this way, the task resources required to be occupied by the photographing task are locked, which can avoid operation errors caused by repetitive selection of the same task resources for subsequent photographing tasks.

In step 140, the server determines the remote sensing satellite control request as an invalid remote sensing satellite control request.

It can be understood that, in the above implementations according to the embodiment of the present disclosure, the electronic device is used as a server, and thus a method applied to the server side is exemplarily described. Hereinafter, in an embodiment of the present disclosure, the electronic device is used as a terminal device, and thus a method applied to the terminal device side will be exemplarily described.

Figure 4:
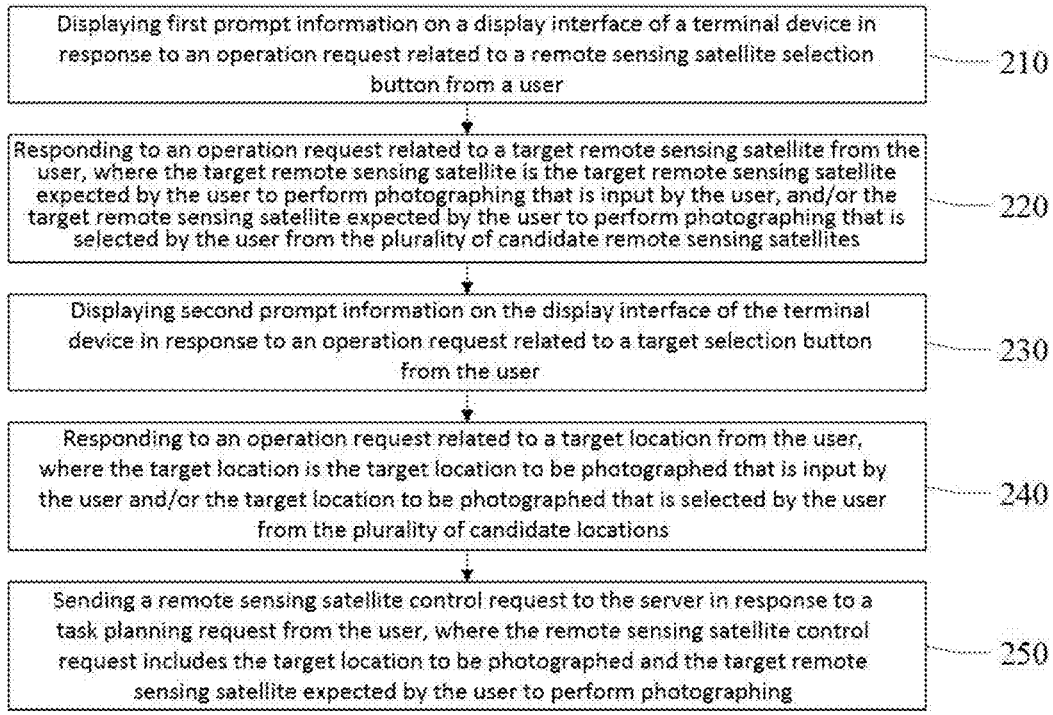
FIG. 4 is another schematic flowchart of a method for controlling remote sensing satellites for multiple terminals according to an embodiment of the present disclosure.

Referring to FIG. 4, FIG. 4 is another schematic flowchart of a method for controlling remote sensing satellites for multiple terminals according to an embodiment of the present disclosure. The method may include the following steps 210 to 250.

In step 210, a terminal device displays first prompt information on a display interface of the terminal device in response to an operation request related to a remote sensing satellite selection button from a user.

In some possible implementations, the first prompt information may be configured to guide the user to input a target remote sensing satellite expected by the user to perform photographing; or the first prompt information may be configured to guide the user to select a target remote sensing satellite expected by the user to perform photographing from a plurality of candidate remote sensing satellites displayed on the display interface of the terminal device; or the first prompt information may be configured to guide the user to input a target remote sensing satellite expected by the user to perform photographing and guide the user to select a target remote sensing satellite expected by the user to perform photographing from a plurality of candidate remote sensing satellites displayed on the display interface of the terminal device.

Figure 7A:
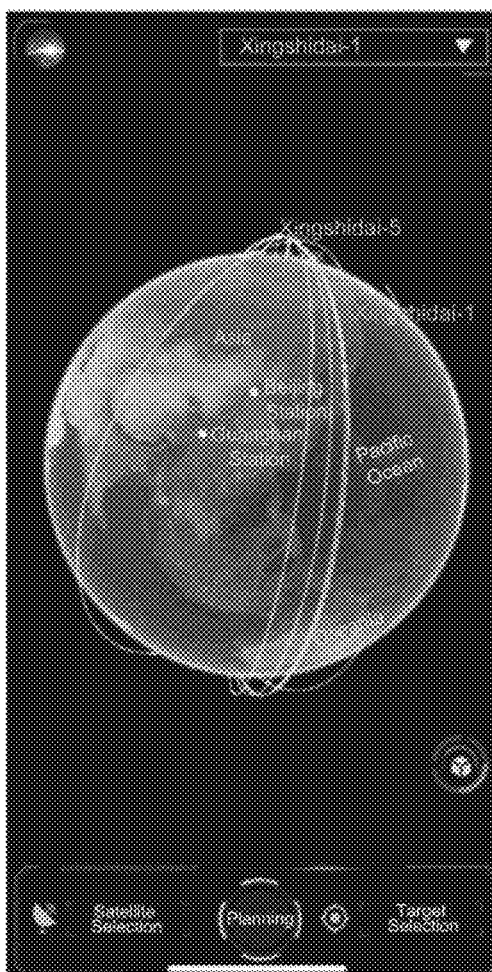
FIG. 7a is a schematic diagram of an application of a method for controlling remote sensing satellites for multiple terminals according to an embodiment of the present disclosure.
Figure 7B:
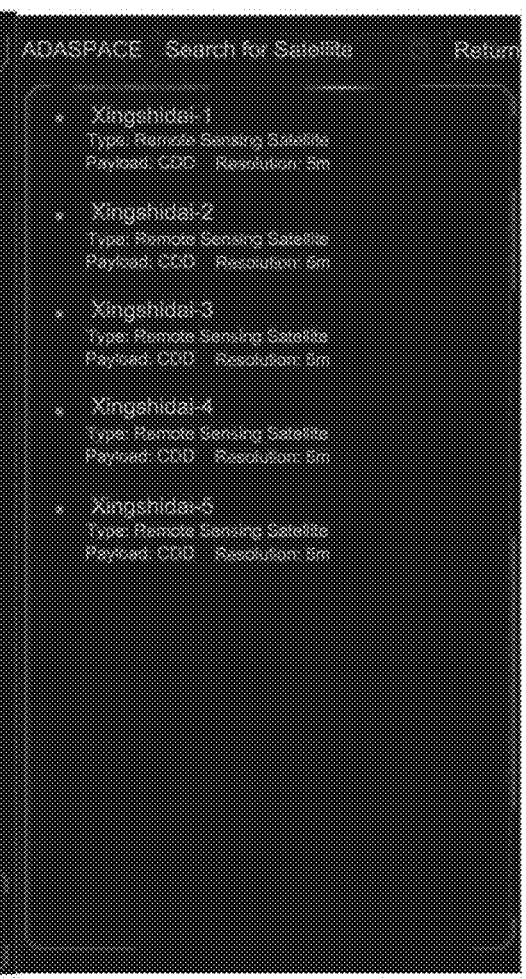
FIG. 7b is a schematic diagram of the application of the method for controlling remote sensing satellites for multiple terminals according to an embodiment of the present disclosure.

Exemplarily, referring to FIG. 7a, FIG. 7a shows a schematic diagram of the display interface of the terminal device of the user. A remote sensing satellite selection button may be located at the lower left corner of FIG. 7a. The user may click on the remote sensing satellite selection button to make an operation request related to the remote sensing satellite selection button, and then remote sensing satellite information of multiple remote sensing satellites as shown in FIG. 7b, for example, Xingshidai-1 (Type: Remote Sensing Satellite, Payload: CCD, Resolution: 5 m) and Xingshidai-2 (Type: Remote Sensing Satellite, Payload: CCD, Resolution: 5 m), may be displayed on the display interface of the terminal device.

In step 220, the terminal device responds to an operation request related to a target remote sensing satellite from the user, where the target remote sensing satellite is the target remote sensing satellite expected by the user to perform photographing that is input by the user, and/or the target remote sensing satellite expected by the user to perform photographing that is selected by the user from the plurality of candidate remote sensing satellites.

In some possible implementations, the operation request related to a target remote sensing satellite may be triggered by inputting a target remote sensing satellite in a search box at the top of the display interface shown in FIG. 7b by the user, or may be triggered by clicking on one of the multiple candidate remote sensing satellites shown in FIG. 7b by the user. For example, if the user selects Xingshidai-1, Xingshidai-1 is the target remote sensing satellite selected by the user to perform photographing.

In step 230 the terminal device displays second prompt information on the display interface of the terminal device in response to an operation request related to a target selection button from the user.

In some possible implementations, the second prompt information may be configured to guide the user to input a target location to be photographed; or the second prompt information may be configured to guide the user to select a target location to be photographed from a plurality of candidate locations displayed on the display interface of the terminal device; or the second prompt information may be configured to guide the user to input a target location to be photographed and guide the user to select a target location to be photographed from a plurality of candidate locations displayed on the display interface of the terminal device.

Figures 7C, 7D:
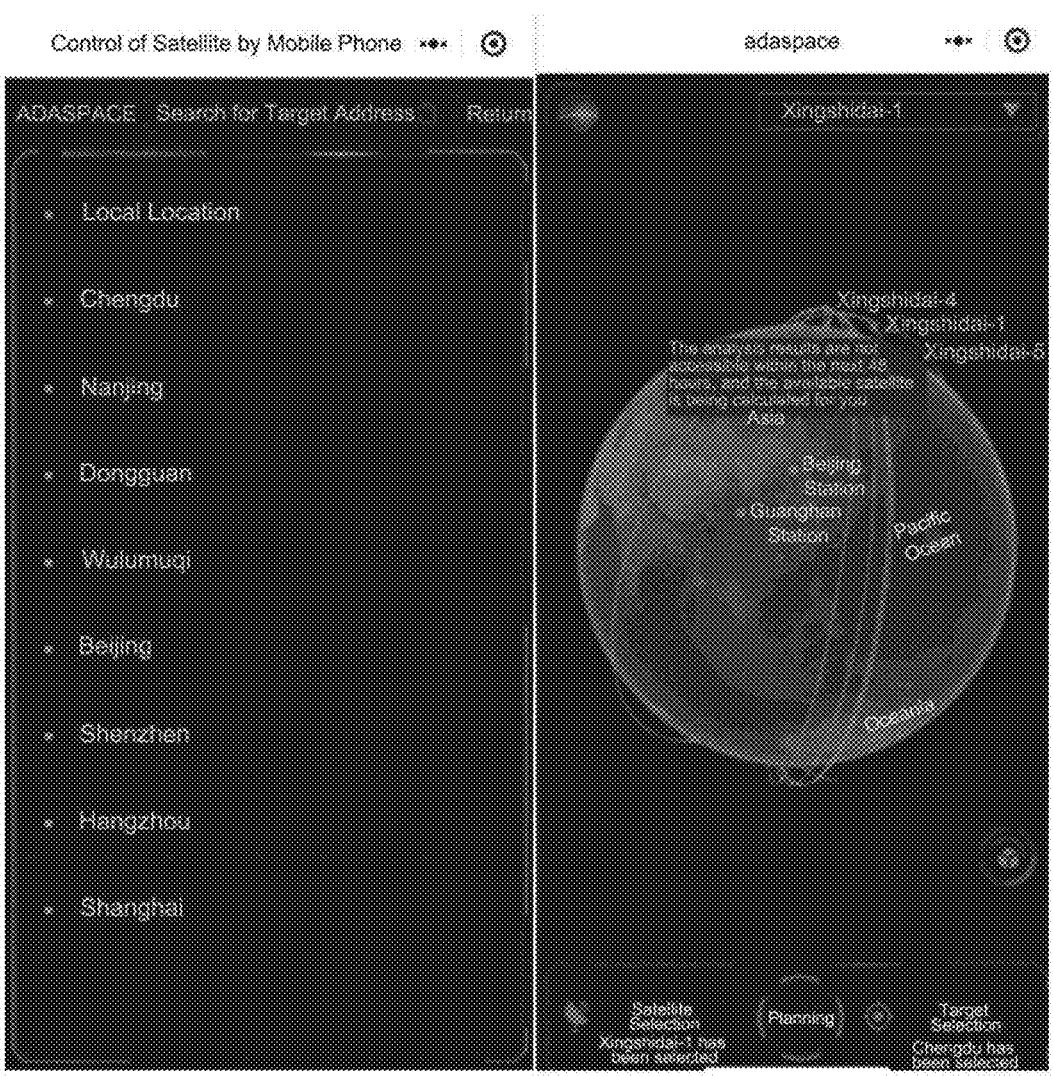
FIG. 7c is a schematic diagram of the application of the method for controlling remote sensing satellites for multiple terminals according to an embodiment of the present disclosure.
FIG. 7d is a schematic diagram of the application of the method for controlling remote sensing satellites for multiple terminals according to an embodiment of the present disclosure.

Exemplarily, a target selection button may be located at the lower right corner of FIG. 7a. The user may click on the target selection button to send an operation request related to the target selection button, and then multiple candidate locations as shown in FIG. 7c, for example, Chengdu, Nanjing, and Dongguan, may be displayed on the display interface of the terminal device. The above-mentioned second prompt information may be the displayed content as shown in FIG. 7c. The user may input a target location to be photographed in the search box at the top of the interface shown in FIG. 7c, or may select a target location from the multiple candidate locations shown in FIG. 7c.

In step 240, the terminal device responds to an operation request related to a target location from the user, where the target location is the target location to be photographed that is input by the user and/or the target location to be photographed that is selected by the user from the plurality of candidate locations.

In some possible implementations, the user's operation request related to a target location may be triggered by inputting a target location to be photographed in the search box at the top of the interface shown in FIG. 7c by the user, or may be triggered by clicking on a target location from among the multiple candidate locations shown in FIG. 7c by the user. For example, if the user operation relates to Chengdu, Chengdu is the target location to be photographed that is input by the user.

In step 250, the terminal device sends a remote sensing satellite control request to the server in response to a task planning request from the user, where the remote sensing satellite control request includes the target location to be photographed and the target remote sensing satellite expected by the user to perform photographing.

Exemplarily, a button for planning may be located in the middle of the bottom of FIG. 7a. The user may click on the button for planning to send a remote sensing satellite control request to the server. The remote sensing satellite control request includes the target location to be photographed (e.g., Chengdu selected by the user) and the target remote sensing satellite expected by the user to perform photographing (e.g., Xingshidai-1 selected by the user).

Figures 7E, 7F:
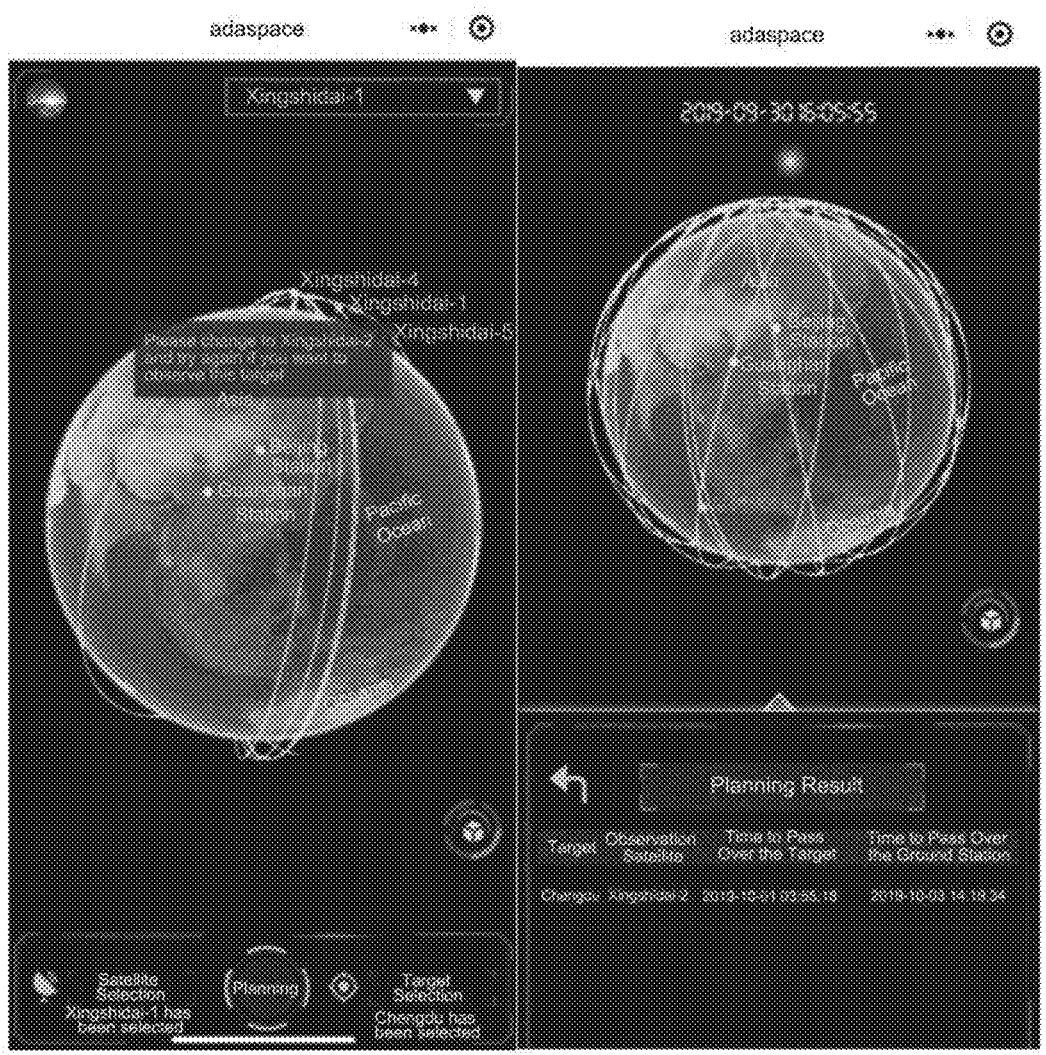
FIG. 7e is a schematic diagram of the application of the method for controlling remote sensing satellites for multiple terminals according to an embodiment of the present disclosure.
FIG. 7f is a schematic diagram of the application of the method for controlling remote sensing satellites for multiple terminals according to an embodiment of the present disclosure.

If Xingshidai-1 cannot arrange a photographing task corresponding to the target location while Xingshidai-2 can arrange the photographing task corresponding to the target location, FIGS. 7d and 7e show a prompt that Xingshidai-1 cannot arrange the photographing task corresponding to the target location (i.e., Chengdu), and FIG. 7f shows a prompt that Xingshidai-2 can arrange the photographing task corresponding to the target location (i.e., Chengdu).

In a possible implementation, the user may select the above-mentioned buttons by means of clicking on the touch screen of the terminal device, or may select the above-mentioned buttons by means of voice input. The mode in which the user inputs information is not limited in the embodiment of the present disclosure.

Figure 5:
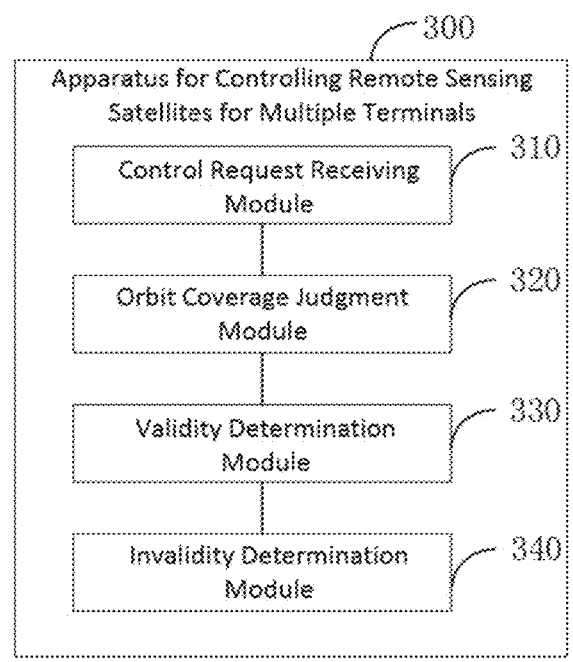
FIG. 5 shows a schematic diagram of an apparatus for controlling remote sensing satellites for multiple terminals according to an embodiment of the present disclosure.

Referring to FIG. 5, FIG. 5 shows an apparatus 300 for controlling remote sensing satellites for multiple terminals according to an embodiment of the present disclosure. The apparatus 300 for controlling remote sensing satellites for multiple terminals may include:

a control request receiving module 310 configured to receive at least one remote sensing satellite control request sent from a terminal device, where the remote sensing satellite control request includes a target location to be photographed and a target remote sensing satellite expected by a user to perform the photographing;

an orbit coverage judgment module 320 configured to calculate an orbit of a target remote sensing satellite corresponding to each remote sensing satellite control request for each of the at least one remote sensing satellite control request, and judge whether the orbit of the target remote sensing satellite covers the target location in the remote sensing satellite control request corresponding to the target remote sensing satellite;

a validity determination module 330 configured to determine the remote sensing satellite control request as a valid remote sensing satellite control request and control the target remote sensing satellite corresponding to the remote sensing satellite control request to perform a photographing task, when the orbit of the target remote sensing satellite covers the target location in the remote sensing satellite control request corresponding to the target remote sensing satellite; and an invalidity determination module 340 configured to determine the remote sensing satellite control request as an invalid remote sensing satellite control request when the orbit of the target remote sensing satellite does not cover the target location in the remote sensing satellite control request corresponding to the target remote sensing satellite.

It should be noted that the apparatus 300 for controlling remote sensing satellites for multiple terminals shown in FIG. 5 implements the functions corresponding to and the same as those of the method for controlling remote sensing satellites for multiple terminals shown in FIG. 1. The specific functions performed by the apparatus 300 for controlling remote sensing satellites for multiple terminals may be understood with reference to the above-mentioned method for controlling remote sensing satellites for multiple terminals applied to the server side according to the embodiment of the present disclosure and will not be described in detail here for the sake of a brief description.

Figure 6:
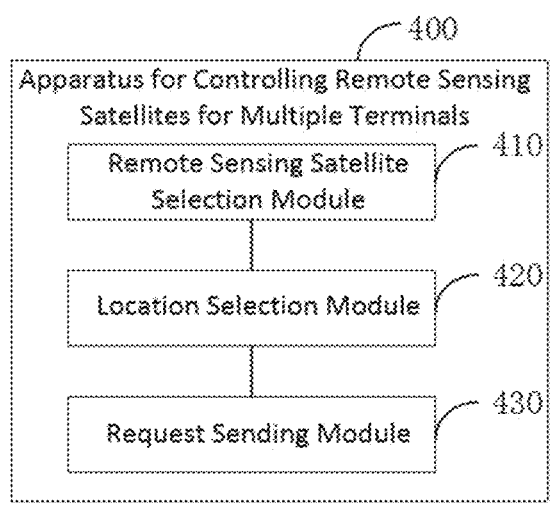
FIG. 6 shows a schematic diagram of an apparatus for controlling remote sensing satellites for multiple terminals according to another embodiment of the present disclosure.

Referring to FIG. 6, FIG. 6 shows an apparatus 400 for controlling remote sensing satellites for multiple terminals according to an embodiment of the present disclosure. The apparatus 400 for controlling remote sensing satellites for multiple terminals may include:

a remote sensing satellite selection module 410 configured to display first prompt information on a display interface of a terminal device in response to an operation request related to a remote sensing satellite selection button from a user, where the first prompt information is configured to guide the user to input a target remote sensing satellite expected by the user to perform photographing, and/or the first prompt information is configured to guide the user to select a target remote sensing satellite expected by the user to perform photographing from a plurality of candidate remote sensing satellites displayed on the display interface of the terminal device; and further configured to respond to an operation request related to a target remote sensing satellite from the user, where the target remote sensing satellite is the target remote sensing satellite expected by the user to perform photographing that is input by the user, and/or the target remote sensing satellite expected by the user to perform photographing that is selected by the user from the plurality of candidate remote sensing satellites;

a location selection module 420 configured to display second prompt information on the display interface of the terminal device in response to an operation request related to a target selection button from the user, where the second prompt information is configured to guide the user to input a target location to be photographed, and/or the second prompt information is configured to guide the user to select a target location to be photographed from a plurality of candidate locations displayed on the display interface of the terminal device; and further configured to respond to an operation request related to a target location from the user, where the target location is the target location to be photographed that is input by the user and/or the target location to be photographed that is selected by the user from the plurality of candidate locations; and a request sending module 430 configured to send a remote sensing satellite control request to the server in response to a task planning request from the user, where the remote sensing satellite control request includes the target location to be photographed and the target remote sensing satellite expected by the user to perform photographing.

It should be noted that the apparatus for controlling remote sensing satellites for multiple terminals shown in FIG. 6 is corresponding to and the same as the method for controlling remote sensing satellites for multiple terminals shown in FIG. 4. The specific functions performed by the apparatus 400 for controlling remote sensing satellites for multiple terminals may be understood with reference to the above-mentioned method for controlling remote sensing satellites for multiple terminals applied to the terminal device side according to the embodiment of the present disclosure and will not be described in detail here for the sake of a brief description.

Figure 8:
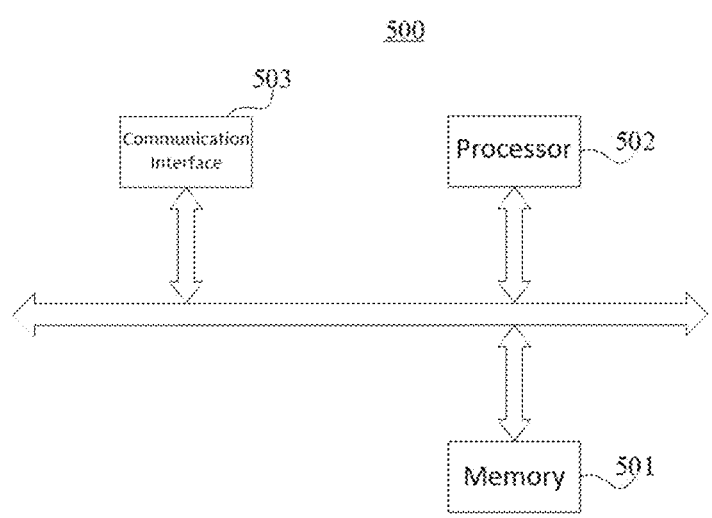
FIG. 8 is a schematic structural block diagram of an electronic device according to an embodiment of the present disclosure.

In addition, as shown in FIG. 8, an embodiment of the present disclosure further provides an electronic device 500. The electronic device 500 may be used as a server or a terminal device in the above-mentioned method for controlling remote sensing satellites for multiple terminals according to an embodiment of the present disclosure.

Here, as a possible implementation, the electronic device 500 may include a memory 501, a processor 502, and a communication interface 503. The memory 501, the processor 502, and the communication interface 503 are directly or indirectly electrically connected to one another to implement data transmission or interaction. For example, these elements may be electrically connected to one another via one or more communication buses or signal lines.

The memory 501 may be configured to store software programs and modules, such as program instructions/modules corresponding to the apparatus for controlling remote sensing satellites for multiple terminals according to the present disclosure. The processor 502 may execute the software programs and modules stored in the memory 501 to execute various functional applications and data processing so as to execute the steps of the method for controlling remote sensing satellites for multiple terminals according to the present disclosure. The communication interface 503 may be configured to perform signaling or data communication with other node devices.

Here, the memory 501 may be, but is not limited to, a random access memory (RAM), a read only memory (ROM), a programmable read-only memory (PROM), an erasable programmable read-only memory (EPROM), an electric erasable programmable read-only memory (EEPROM), or the like.

The processor 502 may be an integrated circuit chip with signal processing capability. The processor 502 may be a general-purpose processor such as a central processing unit (CPU), a network processor (NP), or the like, or may be a digital signal processor (DSP), an application specific integrated circuit (ASIC), a field-programmable gate array (FPGA) or another programmable logic device, a discrete gate or a transistor logic device, or a discrete hardware component.

Based on the same inventive concept as the foregoing method embodiment, an embodiment of the present disclosure further provides a computer-readable storage medium on which some computer programs are stored. When these computer programs are invoked and run by a processor, the methods involved in the foregoing method embodiment and in any possible design of the method embodiment can be carried out. The computer-readable storage medium is not limited in the embodiment of the present disclosure and may, for example, be a RAM (random-access memory), a ROM (read-only memory), or the like.

Based on the same inventive concept as the foregoing method embodiment, the present disclosure further provides a computer program product. When the computer program product is running on a computer, the methods involved in the method embodiment and in any possible design of the foregoing method embodiment can be carried out.

Here, the electronic device, the computer-readable storage medium, and the computer program product according to the embodiments of the present disclosure may each be configured to execute the corresponding methods according to the foregoing embodiments, and therefore can achieve the same advantageous effects as those achieved in the corresponding methods provided hereinabove, which will not be described in detail here.

In the embodiments according to the present disclosure, it should be understood that the disclosed apparatuses and methods may be implemented in other ways. The embodiments of the apparatuses described above are merely illustrative in nature. For example, the units are divided only by logical functions, and additional division modes may be adopted in practical implementation. For another example, multiple units or components may be combined or integrated into another system, or some features may be omitted or not executed. In addition, the mutual coupling, or direct coupling or communication connection illustrated or discussed may be implemented via indirect coupling or communication connection between some communication interfaces, apparatuses, or units, which may be electronic, mechanical, or in other forms.

In addition, the units described as separate components may be or not be separated physically. The components illustrated as units may be or not be physical units. In other words, they may be located at one place or they may be distributed onto multiple network units. Some or all of the units may be selected as actually required to achieve the objectives of the solutions of the embodiments.

Besides, the individual functional modules in the embodiments of the present disclosure may be integrated together to form an independent part, or each of the modules may be physically stand-alone, or two or more of the modules may be integrated into an independent part.

Relationship terms such as first, second, and the like are used herein only for distinguishing one entity or operation from another entity or operation, while it is not necessarily required or implied that these entities or operations have any such practical relationship or order.

The above description is merely illustrative of the embodiments of the present disclosure and is not intended to limit the scope of protection of the present disclosure. It will be understood by those skilled in the art that various modifications and variations may be made to the present disclosure. Any modifications, equivalent alternatives, improvements and so on made within the spirit and principle of the present disclosure are intended to be encompassed within the scope of protection of the present disclosure.

INDUSTRIAL APPLICABILITY

The server calculates an orbit of a target remote sensing satellite corresponding to each remote sensing satellite control request and judges whether the orbit covers the target location. If the orbit covers the target location, the server determines the corresponding remote sensing satellite control request as a valid remote sensing satellite control request and may control the target remote sensing satellite corresponding to the valid remote sensing satellite control request to perform a photographing task. If the orbit does not cover the target location, the server determines the remote sensing satellite control request as an invalid remote sensing satellite control request. In this way, in the above implementations according to the embodiments of the present disclosure, the user only needs to select the target remote sensing satellite and the target location, and the terminal can generate the corresponding remote sensing satellite control condition according to the user's selection. Subsequently, the server will judge whether the remote sensing satellite control request is valid and control the corresponding target remote sensing satellite to perform a task of photographing the target location. The implementations according to the embodiments of the present disclosure can effectively reduce the workload of configurators and reduce difficulty in configuration.

What is claimed is:

1. A method for controlling remote sensing satellites for multiple terminals, comprising:
   receiving at least one remote sensing satellite control request sent from a terminal device by a server, wherein the remote sensing satellite control request comprises a target location to be photographed and a target remote sensing satellite expected by a user to perform photographing;
   calculating, by the server, an orbit of a target remote sensing satellite corresponding to each remote sensing satellite control request for each of the at least one remote sensing satellite control request, and judging whether the orbit of the target remote sensing satellite covers the target location in the remote sensing satellite control request corresponding to the target remote sensing satellite, wherein
   when the orbit of the target remote sensing satellite covers the target location in the remote sensing satellite control request corresponding to the target remote sensing satellite, the remote sensing satellite control request is determined as a valid remote sensing satellite control request and the target remote sensing satellite corresponding to the remote sensing satellite control request is controlled to perform a photographing task by the server; and
   when the orbit of the target remote sensing satellite does not cover the target location in the remote sensing satellite control request corresponding to the target remote sensing satellite, the remote sensing satellite control request is determined as an invalid remote sensing satellite control request by the server.

2. The method for controlling remote sensing satellites for multiple terminals according to claim 1, wherein the remote sensing satellite control request is determined as the valid remote sensing satellite control request and the target remote sensing satellite corresponding to the remote sensing satellite control request is controlled to perform the photographing task by the server, comprising:
   returning the remote sensing satellite control request determined as the valid remote sensing satellite control request to a corresponding terminal device by the server, so that the terminal device selects, from the remote sensing satellite control request determined as the valid remote sensing satellite control request that is returned by the server, at least one remote sensing satellite control request as a remote sensing satellite control request to be executed and resubmits the remote sensing satellite control request to be executed to the server; and
   controlling, by the server, the target remote sensing satellite corresponding to the remote sensing satellite control request to be executed to perform the photographing task according to the remote sensing satellite control request to be executed that is resubmitted by the terminal device.

3. The method for controlling remote sensing satellites for multiple terminals according to claim 2, wherein the controlling, by the server, the target remote sensing satellite corresponding to the remote sensing satellite control request to be executed to perform the photographing task according to the remote sensing satellite control request to be executed that is resubmitted by the terminal device comprises:
   causing the server to receive at least one remote sensing satellite control request to be executed that is resubmitted by the terminal device, wherein the remote sensing satellite control request to be executed comprises a valid target location to be photographed and a valid target remote sensing satellite intended to perform the photographing;
   causing the server to calculate, for each remote sensing satellite control request to be executed, information on a first time point at which the valid target remote sensing satellite enters a ground station, wherein the ground station is configured to receive information transmitted from a corresponding remote sensing satellite;
   causing the server to calculate, according to position information of the valid target location, orbit information of the valid target remote sensing satellite, and position information of the valid target remote sensing satellite at a current time point, information on a second time point at which the valid target remote sensing satellite enters the valid target location; and
   causing the server to arrange a photographing task corresponding to coordinates of the valid target location to a selected position of a task list of the valid target remote sensing satellite according to the information on the first time point and the information on the second time point.

4. The method for controlling remote sensing satellites for multiple terminals according to claim 3, further comprising, after the causing the server to arrange a photographing task corresponding to coordinates of the valid target location to a selected position of a task list of the valid target remote sensing satellite according to the information on the first time point and the information on the second time point,
   causing the server to lock task resources required to be occupied by a task of photographing the valid target location to be photographed by using a resource lock.

5. The method for controlling remote sensing satellites for multiple terminals according to claim 3, wherein the causing the server to calculate information on a first time point at which the valid target remote sensing satellite enters a ground station comprises:
   causing the server to calculate, according to the position information of the valid target remote sensing satellite at the current time point and position information of a ground station corresponding to the valid target remote sensing satellite, information on an angle of the valid target remote sensing satellite relative to a corresponding ground station at the current time point; and
   causing the server to calculate, according to the information on the angle of the valid target remote sensing satellite relative to the corresponding ground station at the current time point, an antenna constraint condition, and the orbit information of the valid target remote sensing satellite, the information on the first time point at which the valid target remote sensing satellite enters the corresponding ground station.

6. The method for controlling remote sensing satellites for multiple terminals according to claim 5, wherein the causing the server to calculate, according to the position information of the valid target remote sensing satellite at the current time point and position information of a ground station corresponding to the valid target remote sensing satellite, information on an angle of the valid target remote sensing satellite relative to a corresponding ground station at the current time point comprises:
converting coordinates related to the position information of the valid target remote sensing satellite at the current time point from a J2000 coordinate system to an earth-fixed coordinate system by the server;
calculating positional coordinates of the valid target remote sensing satellite in a measuring station coordinate system according to coordinates of the valid target remote sensing satellite in the earth-fixed coordinate system by the server; and
calculating the information on the angle of the valid target remote sensing satellite relative to the ground station at the current time point according to the positional coordinates of the valid target remote sensing satellite in the measuring station coordinate system by the server.

7. The method for controlling remote sensing satellites for multiple terminals according to claim 3, wherein the causing the server to calculate, according to position information of the valid target location, orbit information of the valid target remote sensing satellite, and position information of the valid target remote sensing satellite at a current time point, information on a second time point at which the valid target remote sensing satellite enters the valid target location comprises:
causing the server to calculate information on an angle of the valid target remote sensing satellite relative to the valid target location at the current time point according to the position information of the valid target remote sensing satellite at the current time point and the position information of the valid target location; and
causing the server to calculate, according to the information on the angle of the valid target remote sensing satellite relative to the valid target location at the current time point and the orbit information of the valid target remote sensing satellite, the information on the second time point at which the valid target remote sensing satellite enters the valid target location.

8. The method for controlling remote sensing satellites for multiple terminals according to claim 7, wherein the causing the server to calculate information on an angle of the valid target remote sensing satellite relative to the valid target location at the current time point according to the position information of the valid target remote sensing satellite at the current time point and the position information of the valid target location comprises:
converting coordinates of the valid target location from a spherical coordinate system to an earth-fixed coordinate system by the server;
converting coordinates of the valid target location from the earth-fixed coordinate system to a J2000 coordinate system by the server;
converting coordinates of the valid target location from the J2000 coordinate system to an orbital coordinate system by the server; and
calculating, by the server, the information on the angle of the valid target remote sensing satellite relative to the valid target location at the current time point by using the coordinates of the valid target location in the orbital coordinate system and coordinates related to the position information of the valid target remote sensing satellite at the current time point.

9. An apparatus for controlling remote sensing satellites for multiple terminals, comprising:
a control request receiving module, configured to receive at least one remote sensing satellite control request sent from a terminal device, wherein the remote sensing satellite control request comprises a target location to be photographed and a target remote sensing satellite expected by a user to perform photographing;
an orbit coverage judgment module, configured to calculate an orbit of a target remote sensing satellite corresponding to each remote sensing satellite control request for each of the at least one remote sensing satellite control request, and judge whether the orbit of the target remote sensing satellite covers the target location in the remote sensing satellite control request corresponding to the target remote sensing satellite;
a validity determination module, configured to determine the remote sensing satellite control request as a valid remote sensing satellite control request and control the target remote sensing satellite corresponding to the remote sensing satellite control request to perform a photographing task, when the orbit of the target remote sensing satellite covers the target location in the remote sensing satellite control request corresponding to the target remote sensing satellite; and
an invalidity determination module, configured to determine the remote sensing satellite control request as an invalid remote sensing satellite control request when the orbit of the target remote sensing satellite does not cover the target location in the remote sensing satellite control request corresponding to the target remote sensing satellite.

* * * * *